(12) United States Patent
Shimizu et al.

(10) Patent No.: US 10,320,508 B2
(45) Date of Patent: Jun. 11, 2019

(54) TIME SYNCHRONIZATION SYSTEM

(71) Applicant: MEDIA LINKS CO., LTD., Kawasaki-shi, Kanagawa (JP)

(72) Inventors: Takeshi Shimizu, Kawasaki (JP); Kazuki Narita, Kawasaki (JP)

(73) Assignee: MEDIA LINKS CO., LTD., Kawasaki (JP)

( * ) Notice: Subject to any disclaimer, the term of this patent is extended or adjusted under 35 U.S.C. 154(b) by 0 days.

(21) Appl. No.: 15/680,762

(22) Filed: Aug. 18, 2017

(65) Prior Publication Data

US 2018/0062780 A1    Mar. 1, 2018

(30) Foreign Application Priority Data

Aug. 31, 2016  (JP) .................................. 2016-169944

(51) Int. Cl.
*H04J 3/06* (2006.01)
*H04N 21/242* (2011.01)

(52) U.S. Cl.
CPC .......... *H04J 3/0667* (2013.01); *H04J 3/0641* (2013.01); *H04J 3/0644* (2013.01); *H04J 3/0676* (2013.01); *H04N 21/242* (2013.01)

(58) Field of Classification Search
CPC ...... H04J 3/0667; H04J 3/0641; H04J 3/0644; H04J 3/0676; H04N 21/242; H04L 7/04
See application file for complete search history.

(56) References Cited

U.S. PATENT DOCUMENTS

| 2013/0227172 A1* | 8/2013 | Zheng | H04J 3/0641 709/248 |
| 2014/0281037 A1* | 9/2014 | Spada | H04L 69/28 709/248 |
| 2016/0013876 A1* | 1/2016 | Zhang | H04J 3/0641 370/350 |

FOREIGN PATENT DOCUMENTS

| EP | 2908452 A1 | 8/2015 |
| JP | 2015-188152 A | 10/2015 |
| JP | 2015-188159 A | 10/2015 |

OTHER PUBLICATIONS

Jan. 18, 2018 Search Report issued in European Patent Application No. 17188353.1.

* cited by examiner

*Primary Examiner* — Kibrom T Hailu
(74) *Attorney, Agent, or Firm* — Oliff PLC

(57) ABSTRACT

A time synchronization system includes master nodes and slave nodes configured to correct a local slave clock by synchronizing time with time in a local master clock. A first master node corrects a first local master clock at predetermined periodic intervals by synchronizing with a timing synchronization signal from a source clock node having a source clock. If a second local master clock has a greater error from the source clock than the error in the first local master clock, the second master node performs first correction by synchronizing time with time in the first local master clock and performs second correction by synchronizing with the timing synchronization signal from the source clock node on condition that an error in the second local master clock is within a predetermined range after the first correction has been performed.

6 Claims, 7 Drawing Sheets

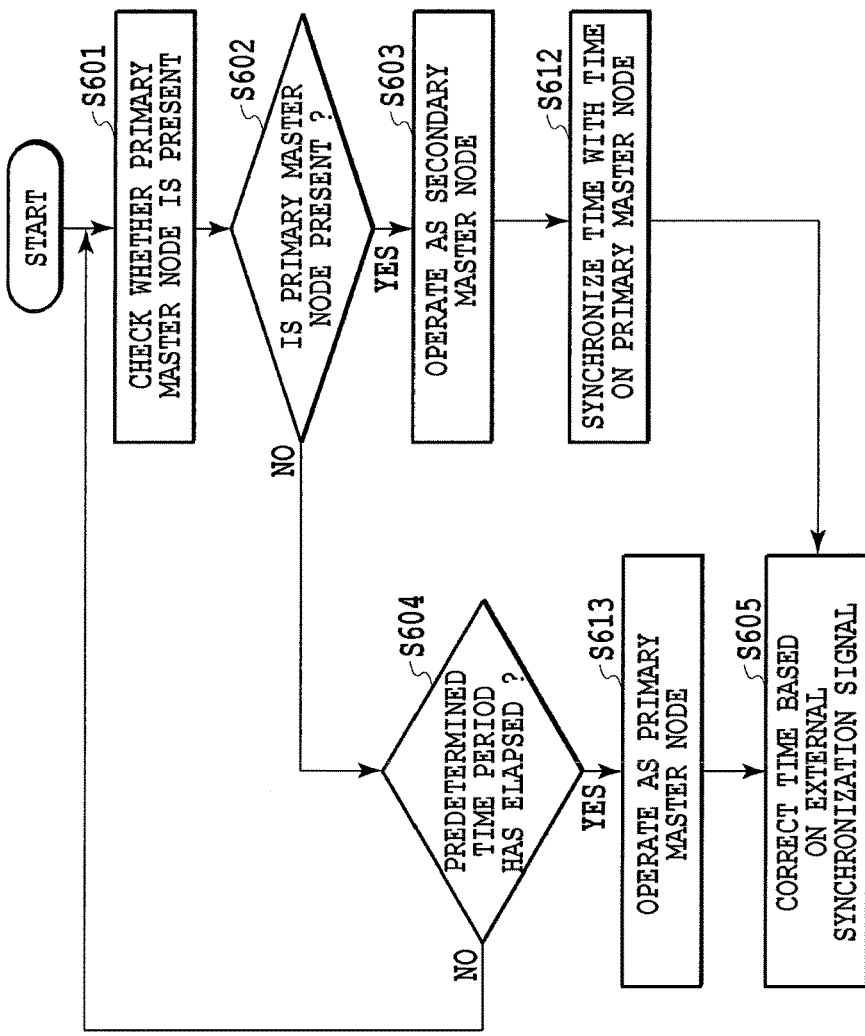

TIME SYNCHRONIZATION SYSTEM

This application claims the benefit of Japanese Patent Application No. 2016-169944, filed Aug. 31, 2016, which is hereby incorporated by reference herein in its entirety.

BACKGROUND OF THE INVENTION

Field of the Invention

The present invention relates to a time synchronization system and in particular to a system for synchronizing time entirely by synchronizing with an external synchronization signal such as a black burst (BB) signal according to a time synchronization protocol such as the Precision Time Protocol (PTP) in a video transmission system and/or a video reproduction system, which distributes, relays, and/or reproduces video signals and audio signals.

Description of the Related Art

A video transmission system is known which transmits a video signal distributed from a (base) broadcast station or the like to receivers at relay stations or the like using unicast or multicast. Such a video transmission system includes a plurality of devices such as transmitters or receivers consisting of the system to achieve redundancy and thereby enhance fault tolerance. Each of these devices synchronize the time based on an external reference signal to adjust the timing in the video signaling.

Methods for the above time synchronization include (1) a method for sending time information (timestamp) from a master node to a slave node to synchronize the time (a method for synchronizing the clock hands), and (2) a method for sending, from a source clock node, for example, a synchronization signal that is a periodic signal at one-second intervals and causing a slave clock to synchronize with this periodic signal (a method for synchronizing the cycles of the clock pendulums).

In the method (1), a time synchronization protocol as represented by the Institute of the Electrical and Electronics Engineers (IEEE) 1588 PTP has been available in recent years, which enables accurate time synchronization over networks such as an Ethernet® network and an IP network. The IEEE 1588 PTP is a protocol for distributing a clock with high accuracy (e.g. nanosecond-order accuracy) over a packet-based network, and the latest version thereof is IEEE 1588-2008 (referred to as IEEE 1588v2).

In the industrial association Society of Motion Picture and Television Engineers (SMPTE), the standard ST2059 defines the clock management and the relation with signal generation timing based on the time synchronization according to the PTP, and specifies, by using International Atomic Time (TAI) as a global clock, video timing generation based on the time elapsed from a reference time (epoch) on the global clock. Specifically, the standard ST2059 specifies the relation between a clock that serves as a reference on a global time axis and the cycle of generation of one screen (frame) of video signal.

The IEEE 1588v2 PTP employs a hierarchical master-slave structure for clock distribution. The hierarchical master-slave structure comprises master nodes and slave nodes. The master node (a reference node that sends its local clock to external nodes) is also referred to as a grand master clock (GMC), and sends time information to the slave nodes according to the above-mentioned method (1). The master node itself corrects its local clock according to the above-mentioned method (2) in a case where the master node uses, as an external synchronization signal, a reference signal once every second (1PPS) generated by a global source clock (such as the GPS or an atomic clock).

The slave node is also referred to as an ordinary clock (OC). The slave node determines the best master clock (BMC) with the highest priority among one or more master nodes according to a specified algorithm, and synchronizes the time with the time in the BMC (according to the above-mentioned method (1)). That is, the slave node corrects its local clock based on time information sent from the BMC.

A node that synchronizes the time with the time in a BMC according to the method (1) and transfers a corrected local clock to networks not connected to the BMC is referred to as a boundary clock (BC).

Since the slave node and the BC only synchronizes the time based on the clocks of their master nodes, the slave node and the BC cannot accurately correct their local clocks if the master nodes has less clock accuracy.

Further, when the slave node or the BC changes its BMC by selecting a mater node with higher priority, the local clock of the master node may differ before and after the change. In this case, correction of the local clock in the slave node or the BC through time synchronization might result in a situation where the clock time jumps to a discrete point or the clock runs faster (or slower) temporarily. This may provide less periodic accuracy in reproducing a periodic signal.

For this reason, even in the case of employing a redundant structure including a plurality of master nodes, the above-mentioned technique is based on the precondition that a predetermined clock is used by all the plurality of master nodes. In other words, all the master nodes are required to generate signals with completely the same frequency based on the same source clock (e.g. the GPS, an atomic clock, or the like) and thus have identical clocks.

A conventional master node corrects its local clock by using a signal generated once every second (1PPS) and a global source clock (such as the GPS or an atomic clock) at that moment. Thus, if a BB signal is generated by an independent source clock node and that BB signal differs in time standard from the global source clock, the master node can neither correct its clock nor generate correct timing based on the BB signal. Suppose, for example, that an independent source clock such as a BB signal has a frequency different from a global source clock in terms of 1 PPM accuracy. In this case, for $\frac{1}{30}$-cycle video frames, a time lag of one frame occurs in 20,000 seconds, which is approximately five and a half hours.

In the above-mentioned video transmission system, the master node receives a BB signal or the like as an external synchronization signal, and that BB signal is used as a source clock for the system entirely. On the other hand, in such a video transmission system, not all nodes can always receive the source clock from the source clock node. Under such situation, the system needs to synchronize the time by synchronizing with the external synchronization signal.

In global source clocks the time corresponding to any 1PPS signal is managed as "Time of Day." Thus, a master node using a global source clock can correct its local clock at any time according to the above-mentioned method (2). In contrast, as for a BB signal generated by an independent source clock, its relation with global time is unknown, which makes it impossible to uniquely determine an expected value of a local clock that is supposed to be set at the start of the correction according to the method (2).

Referring to FIGS. 1A and 1B, suppose that in a time synchronization system according to the IEEE 1588v2 PTP, one of a plurality of redundant master nodes is in a fault state and stops functioning as a master node. The time synchronization system illustrated in FIG. 1A include two master nodes MA and MB and two slave nodes SA and SB. The slave nodes SA and SB are connected to both of the master nodes MA and MB (elements such as switches provided between the master and slave nodes are omitted for simplicity). The master node MA has ports AP1 and AP2, and communicates with the master node MB through the port AP1 and communicates with the slave nodes SA and SB through the port AP2. Likewise, the master node MB has ports BP1 and BP2, and communicates with the master node MA through the port BP1 and communicates with the slave nodes SA and SB through the port BP2.

The master nodes MA and MB can have identical local clocks by being activated exactly at the same time, and thereafter correct and maintain their local clocks by using the same synchronization signal. Each of the slave nodes SA and SB determines one of the master nodes MA and MB as own BMC and synchronizes the time with the time in that BMC.

For example, if the master node MB is in a fault state, the master node MB is temporarily detached from the time synchronization system. When the fault is fixed and the master node MB is attached to the time synchronization system, the local clock of the master node MB may have the time different from the master node MA since the local clock of the master node MB has not been matched to the source clock of the time synchronization system.

As mentioned above, under the condition where clocks are corrected based on an external synchronization signal such as a BB signal, the BB signal is merely a timing synchronization signal. Thus, unless the source clock node generates as the source clock a BB signal accurately synchronized with a global clock, there is a problem that the local clock of the master node MB cannot be accurately matched to the local clock of the master node MA, which makes it impossible to correct and reproduce the local clock of the master node MB.

Here, while states of ports in a master node are specified in the IEEE 1588v2 PTP, each port may autonomously transition its state. For this reason, if, for example, the state of the port BP2 of the master node MB transitions to a MASTER state when the master node MB is attached to the time synchronization system, any of the slave nodes SA and SB might synchronizes the time with the master node MB. In such a case, the accuracy for the local clock of that slave node is not guaranteed. Synchronizing the time with a master node with the different time might result in a situation where the time in the clock jumps to a discrete point or changes abruptly from the time before the time synchronization.

In order to match the local clock of the master node MB to the local clock of the master node MA and transfer information after that matching to a slave node, one possible method is to reactivate the master node MB as the above-mentioned BC node, as illustrated in FIG. 1B. In this case, the node MB as a BC node firstly synchronizes the time with the time in the master node MA through the port BP1, which is in a SLAVE state, according to the method (1) and then transfers time information after that time synchronization to the slave node through the port BP2, which is in the MASTER state. In this way, even when the communication channel between the master node MA and the slave node is in a fault state, the slave node can continue its time synchronization according to the method (1) through the BC node MB.

In this method, however, since the master node MA is a sole grand master clock, the system will have no node that corrects time according to the method (2) and be disabled from continuing its operation if the master node MA is in a fault state.

Japanese Patent Laid-Open No. 2015-188159 (PTL 1) discloses time synchronization performed by a slave node. In a time synchronization method in accordance with PTL 1, a slave node sends and receives to and from a plurality of master nodes control messages for use in the time synchronization process for synchronizing the time in the slave node with the time in a master node. Then, the slave node corrects an error between the masters in a statistical process and corrects its time based accurate time information. This configuration avoids that the local clock of the slave node is shifted due to errors in delay time between the plurality of master nodes and the slave node resulting from queuing delays at relay devices or the like. However, the time synchronization method in accordance with PTL 1 is based on the precondition that a plurality of master nodes are present, and does not solve the above-mentioned problem by guaranteeing accurate synchronization between a plurality of master nodes.

Japanese Patent Laid-Open No. 2015-188152 (PTL 2) discloses a method of time synchronization performed by a slave node. In the time synchronization method in accordance with PTL 2, if a condition is satisfied indicating less accuracy for the time source of any of a plurality of master nodes with which the slave node performs the time synchronization process for synchronizing the time in the slave node with the time in a master node, a slave node determines a master node other than the master node meeting the condition as own master node to synchronize with. With this configuration, in a case where any of a plurality of master nodes has less accuracy for the time source, it avoids that the slave node synchronizes the time with the time in the master node among the plurality of master nodes having less accuracy for the time source. However, the time synchronization method in accordance with PTL 2 is also based on the precondition that a plurality of master nodes are present, and does not guarantee accurate synchronization between a plurality of master nodes.

The present invention has been made in view of the above problem, and an object thereof is to provide a time synchronization system including a plurality of master nodes which is capable of accurate and efficient time synchronization of the system entirely, for example, if one (secondary master node) of the plurality of master nodes has less clock accuracy. In the time synchronization system, the secondary master node synchronizes the time with the time in a primary master node and then synchronizes time with the time in an external synchronization signal.

SUMMARY OF THE INVENTION

In order to solve the above problem, a time synchronization system in accordance with the present invention includes: a plurality of master nodes; and one or more slave nodes configured to correct a local slave clock thereof by synchronizing time with time in a local master clock of one of the plurality of master nodes. A first master node among the plurality of master nodes is configured to correct a first local master clock of the first master node at predetermined periodic intervals by synchronizing with a timing synchronization signal from a source clock node having a source clock selected for a clock domain. if a second local master clock of a second master node among the plurality of master nodes has a greater error from the source clock than an error of the first local master clock from the source clock, the second master node is configured to perform first correction on the second local master clock by synchronizing time synchronization with time in the first local master clock; and perform second correction on the second local master clock by synchronizing with the timing synchronization signal from the source clock node on condition that an error in the second local master clock from the first local master clock is within a predetermined range after the first correction has been performed.

According to the time synchronization system of the present invention, master nodes in accurate time synchronization with a synchronization signal generated by an independent source clock node can be optionally added and replaced. Thus, a system including a plurality of master nodes can be in accurate time synchronization with each other. Accordingly, the time period for which the system cannot continue its operation due to a fault in a master node (downtime) can be reduced to zero.

Further features of the present invention will become apparent from the following description of exemplary embodiments with reference to the attached drawings.

BRIEF DESCRIPTION OF THE DRAWINGS

FIG. 6 is a diagram showing the relationship of FIGS. 6A and 6B;

FIG. 6A is a flowchart illustrating an example of processes performed by a master node functioning as a secondary master node in accordance with one embodiment of the present invention.

DESCRIPTION OF THE EMBODIMENTS

<Definition of Terms>

A time synchronization system in accordance with the present invention will be described with reference to accompanying drawings. In a time synchronization system in accordance with the following embodiment, the system needs to synchronize with the same clock entirely, and this reference clock will be referred to as "source clock." A domain in which the above source clock is synchronized will be referred to as "clock domain." The clock domain may be within a single network or across a plurality of sub-networks. A node that sends an external synchronization signal as reference of the source clock will be referred to as "source clock node." The source clock node may be inside the clock domain or outside the clock domain.

Further, in this embodiment, among a plurality of master nodes, a node that synchronizes with the external synchronization signal from the source clock node and has the reference clock will be referred to as a primary master node, and the other master nodes will be referred to as secondary master nodes.

In the following embodiment, the time synchronization system in accordance with the present invention is applied to a video transmission system, but is not limited to such an example. The master nodes and the slave nodes consisting in the time synchronization system in accordance with the present invention are implemented in transmitters, receivers, or gateways consisting in a video transmission system.

Further, in this embodiment, description will be given of an example in which time is synchronized according to the IEEE 1588v2 PTP (hereinafter "PTP"). However, the time synchronization method to be used as a base is not limited to the IEEE 1588v2 PTP. For example, any time synchronization method may be used in which a master node receives a clock from a source clock, and a slave node synchronizes the time with the time in that master node.

Figure 1A:
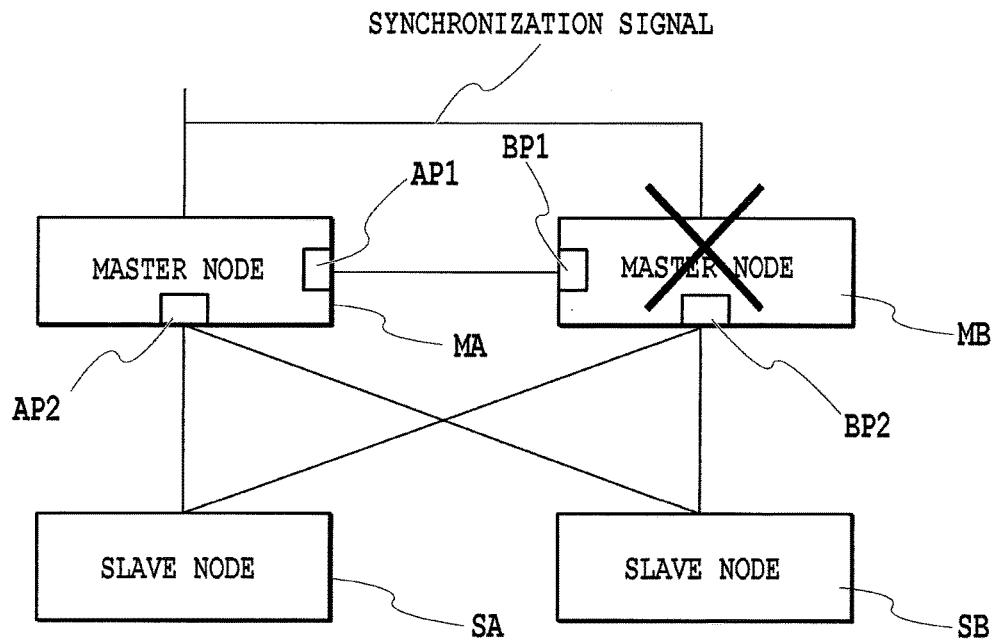
FIG. 1A is a diagram illustrating a simple example of the configuration of a time synchronization system in accordance with a prior technique.
Figure 1B:
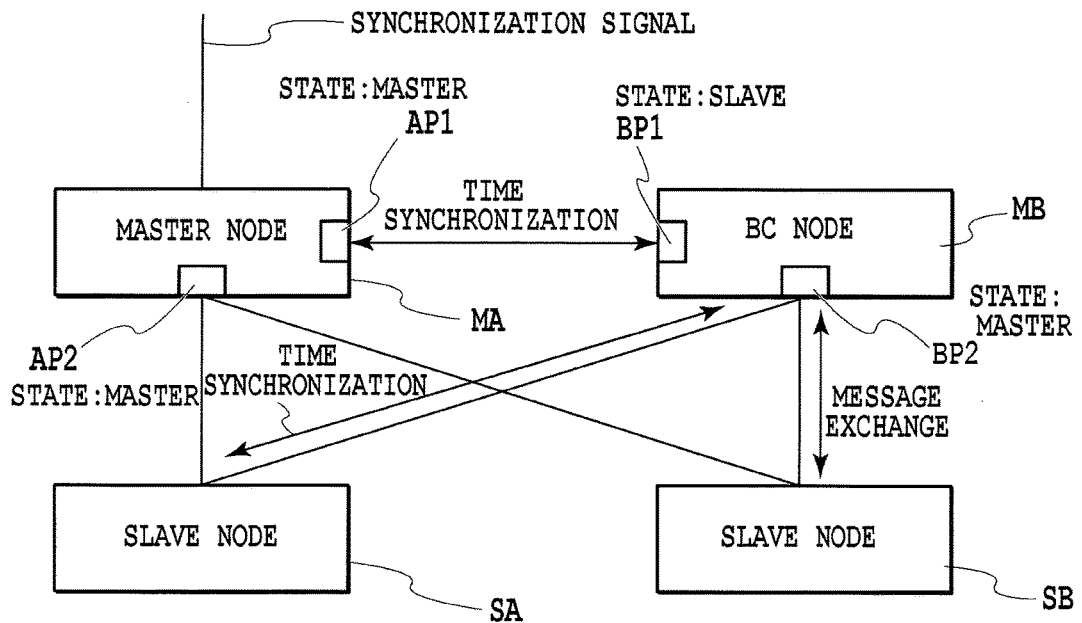
FIG. 1B is a diagram illustrating a simple example of the configuration of a time synchronization system in accordance with a prior technique.
Figure 2:
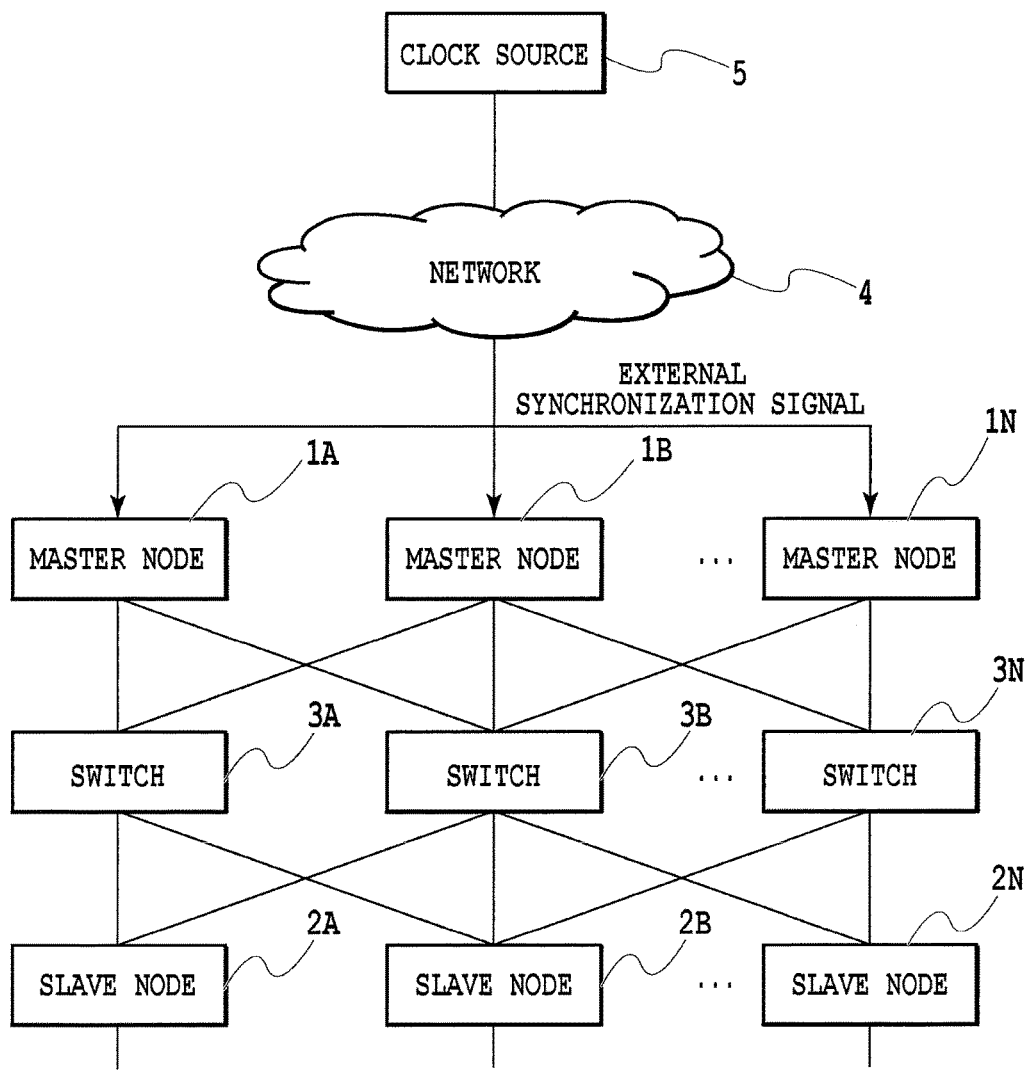
FIG. 2 is a diagram illustrating an example of the entire configuration of a time synchronization system in accordance with one embodiment of the present invention.

FIG. 2 illustrates an example of the entire configuration of a time synchronization system in accordance with one embodiment of the present invention. The time synchronization system in accordance with the present invention includes a plurality of master nodes (master node 1A, master node 1B, . . . master node 1N (N is any number)), a plurality of slave nodes (slave node 2A, slave node 2B, . . . slave node 2N (N is any number)), and a plurality of switches (switch 3A, switch 3B, . . . switch 3N (N is any number)). This time synchronization system forms a hierarchical structure in which the master nodes are in a higher-level layer and the slave nodes are in a lower-level layer.

The master nodes 1A to 1N (hereinafter referred to as "master nodes 1") function as grand master clocks for synchronizing the time according to the PTP. The plurality of master nodes 1 are provided to achieve redundancy in devices and, in the video transmission system, implemented in gateways, for example.

Any one of the plurality of master nodes 1A to 1N functions as a primary master node, and the other one or more function as secondary master nodes. The primary master node synchronizes with an external synchronization signal from an external source clock node (that is, synchronizes the cycle of the clock pendulums with that of the external source clock node) and synchronizes with each secondary master node by using timing synchronization signals having the same frequency. In other words, the primary master node functions as a reference clock within its clock domain. Which master node functions as the primary master node and which master nodes function as the secondary master nodes may be defined in advance (statically).

Each of the plurality of master nodes 1 sends and receives Announce messages or the like to and from each other, and compares its clock accuracy with the clock accuracy for the other master nodes to determine whether the master node 1 should continue functioning as the primary master node (if currently functioning as the primary master node) or the master node 1 should function as a new primary master node (if currently functioning as a secondary master node). In other words, the master node 1 functioning as the primary master node among the plurality of master nodes 1 changes dynamically. This function may be implemented according to the BMC algorithm among master nodes specified in the PTP.

Each master node 1 receives an external synchronization signal from an external source clock node 5 over a network 4 and synchronizes with that external synchronization signal to correct its local clock. While this external synchronization signal may be a BB signal, a 1PPS signal, a GPS signal, or the like, the plurality of master nodes 1 always need to receive external synchronization signals having the same frequency, or frequencies with constant ratios to each other. In one embodiment, the network 4 may be configured as a tree-like network having equal-length pathways which allow equal delays at the master nodes 1 from the source clock node 5. In another embodiment, the network 4 may be configured as a network having uneven pathways which allow unique delays at the respective master nodes 1.

Each of the slave nodes 2A to 2N (hereinafter referred to as "slave nodes 2") synchronizes the time with the time in one master node 1 through one of the switches 3A to 3N (hereinafter referred to as "switches 3") (that is, synchronizes its clock hands with those of the master node based on time information sent from the master node). In the video transmission system, the slave nodes 2 are implemented in transmitters, receivers, or the like. In order to use synchronized signals between these devices, the slave nodes 2 regenerate output synchronization signals and output them. Since these synchronization signals are reproduced from internal clocks, the slave nodes 2 need to synchronize their local clocks. For this reason, each slave node 2 determines its BMC based on the BMC algorithm specified in the PTP, and exchanges PTP messages with that BMC to synchronize time.

Note that although the time synchronization system in accordance with this embodiment includes a plurality of slave nodes 2 and a plurality of switches 3, it is only required to include at least one slave node 2 and at least one switch 3. Also, although the master nodes 1 and the slave nodes 2 are in the same network (sub-network) in this embodiment, the master nodes 1 and the slave nodes 2 may be in different sub-networks and connected to each other (over the network 4 or another network).

Note that in the case where the master nodes 1 and/or the slave nodes 2 are in different sub-networks, control information such as a Sync message is sent over an Ethernet network or an IP network. However, the network is not limited to these networks, but a different type of network may be used. Further, the above-mentioned control information may be sent over a dedicated network (dedicated line) or sent and received over the same network as the network used to transmit video signals, audio signals, and the like.

Next, a time synchronization method according to the PTP performed by a time synchronization system in accordance with one embodiment of the present invention will be described with reference to FIG. 3. The time synchronization to be described here is performed by exchanging the following PTP messages between any slave node 2 and the master node 1 which that slave node 2 has determined as own BMC.

Figure 3:
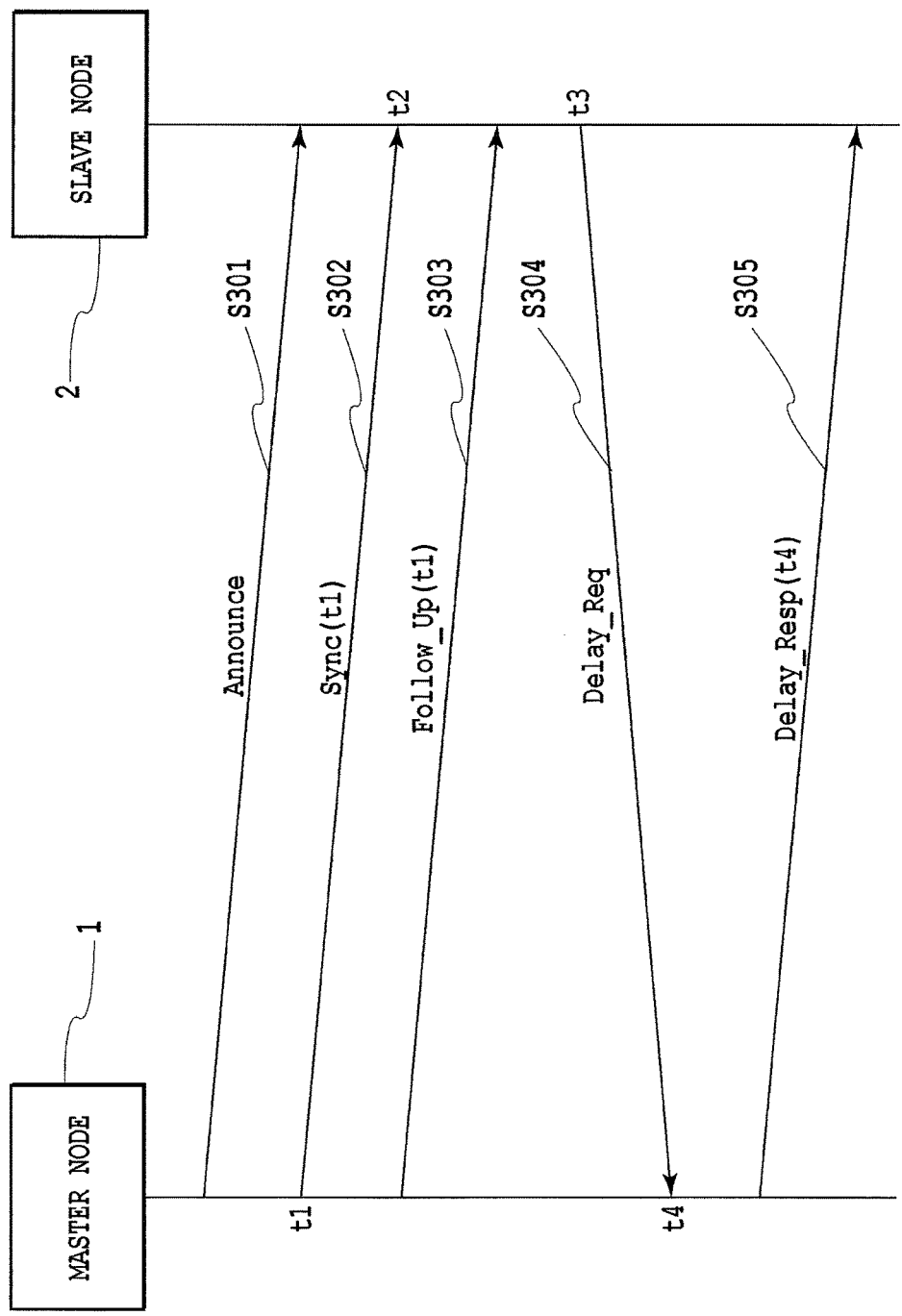
FIG. 3 is a diagram illustrating processing in a time synchronization method according to the PTP performed by a time synchronization system in accordance with one embodiment of the present invention.

As illustrated in FIG. 3, the master node 1 sends an Announce message to the slave node 2, so that an association between the master node 1 and the slave node 2 is established (step S301). The Announce message contains Clock Class information and Clock Accuracy information on the master node 1. The Clock Class information indicates the quality for the source clock, and the Clock Accuracy information indicates the accuracy for time. The Clock Class information and the Clock Accuracy information are specified in the PTP.

When the port of the master node 1 is in a MASTER state, the master node 1 sends the above-mentioned Announce message through the port. The port of the master node 1 can be in the MASTER state or a PASSIVE state as a normal state specified for state transition of a grandmaster clock. However, in embodiments of the present invention, the master node 1 can also be in a SLAVE state, to which the master node 1 never make transition according to the protocol. The state transition will be described later.

Then, the master node 1 sends a Sync message to the slave node 2 (step S302). The Sync message contains the message transmission time (t1). Upon receipt of the Sync message, the slave node 2 records the arrival time (t2).

Then, the master node 1 sends a Follow Up message to the slave node 2 (step S303). Here, in the sending the Sync message, it is difficult to know the message send time in advance. Thus, an expected time of t1 is recorded in the Sync message, and the actual time of t1 is recorded in the Follow Up message. Thus, the error is compensated.

The slave node 2 sends a Delay_Req message to the master node 1 (step S304). In the Delay_Req message, the actual time of the message (t3) is recorded. When the Delay_Req message is received by the master node 1, the arrival time (t4) is recorded.

Then, the master node 1 sends a Delay_Resp message to the slave node 2 (step S305). In the Delay_Resp message, the actual arrival time (t4) of the Delay_Req message is recorded.

Using t1, t2, t3, and t4, the slave node 2 calculates the round-trip delay time and the offset value of the slave node 2 relative to the clock of the master node 1 (the difference between the clock of the master node 1 and the clock of the slave node 2). Given that the one-way-trip delay time is half of the round-trip delay time, the offset value of the slave node 2 is calculated by the following equation.

$$\text{Offset Value of Clock of PTP Slave} = (t2-t1) - (\text{One-Way-Trip Delay Time}) \qquad \text{Equation 1}$$

By reiterating these processes multiple times in one second, the two clocks are maintained in synchronization with each other. In practice, the PTP further involves processes such as time correction to achieve time synchronization with higher accuracy in terms of error, though any further detailed description will not be given in this description. Further, as a method of calculating the difference in delay, a method referred to as peer delay mechanism is available besides the above. Since either method can be used in embodiments of the present invention, no further description will be given in this specification.

Next, a specific example of the configuration of a master node 1 consisting in a time synchronization system in accordance with one embodiment of the present invention will be described with reference to FIG. 4.

Figure 4:
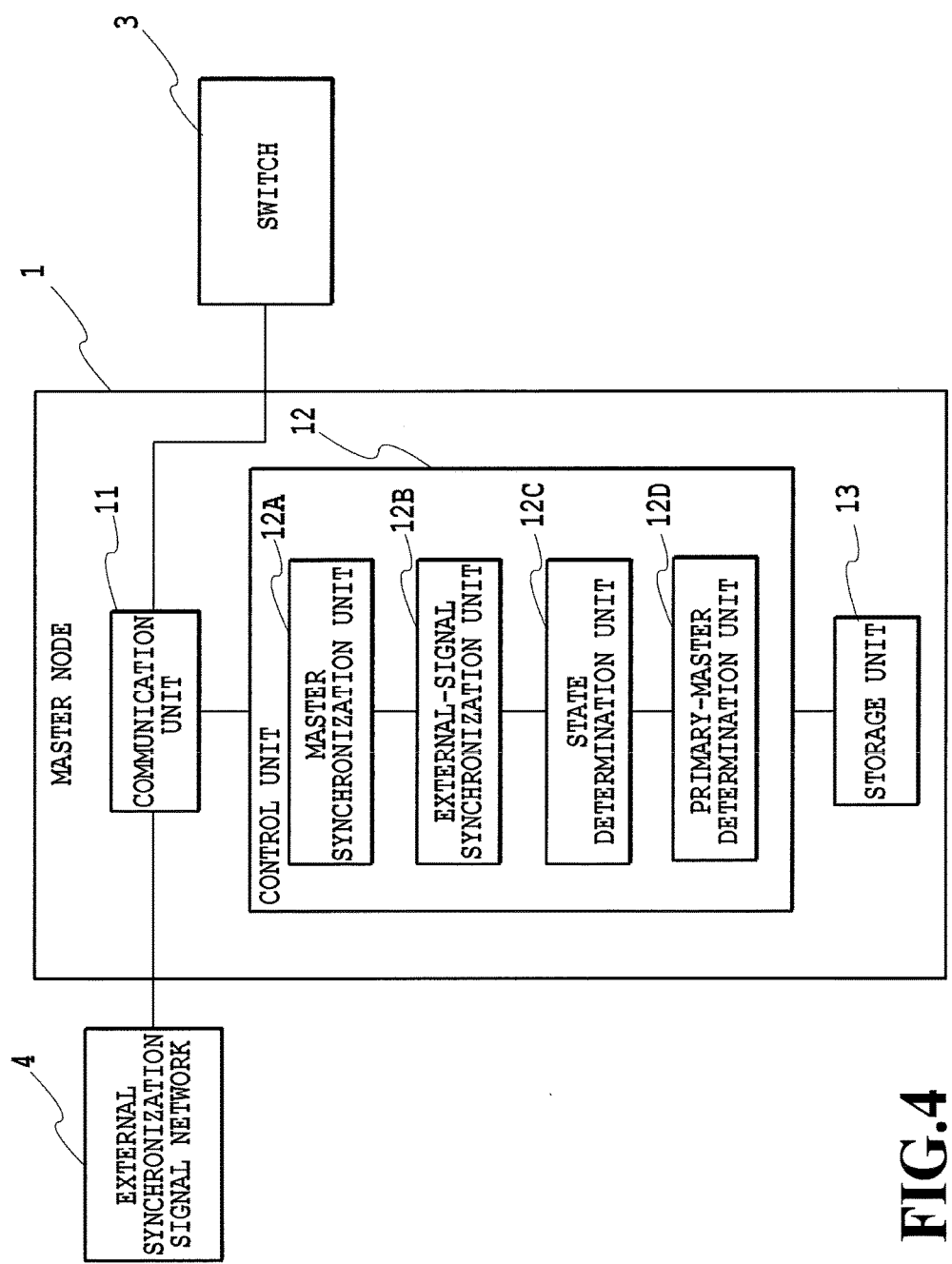
FIG. 4 is a diagram illustrating a specific example of the configuration of a master node consisting in a time synchronization system in accordance with an embodiment of the present invention.

As illustrated in FIG. 4, the master node 1 includes a communication unit 11, a control unit 12, and a storage unit 13, and these units are coupled to each other by an internal bus in the node. The master node 1 functions as a primary master node or a secondary master node.

The communication unit 11 is a network interface that receives an external synchronization signal from the external source clock node 5 over the network 4, and sends and receives PTP messages to and from slave nodes 2. The network 4 may also be implemented as a dedicated network not including any switch 3 via which the signals are sent.

The control unit 12 is a central processing unit (CPU). By executing a predetermined program stored in the storage unit 13, the control unit 12 performs control and operation such that a master synchronization unit 12A, an external-signal synchronization unit 12B, a state determination unit 12C, and a primary-master determination unit 12D can function. Note that the control unit 12 may be implemented using hardware such as an application specific integrated circuit (ASIC), a programmable logic device (PLD), or a field programmable gate array (FPGA).

The master synchronization unit 12A receives the reference clock (timestamp) from the master node 1 functioning as the primary master node and corrects the local clock of its master node 1 based on that reference clock. The correction of the local clock by the master synchronization unit 12A is performed only by the master nodes 1 functioning as the secondary master nodes, and is not performed by the master node 1 functioning as the primary node. In other words, based on the reference clock of the one master node 1 functioning as the primary master node among the plurality master nodes, the other one or more master nodes 1 functioning as the secondary master nodes correct their local clocks.

The master node 1 functioning as a secondary master node makes the port state transition at the communication unit 11 to the SLAVE state on condition that the master node 1 receives the reference clock from the primary master node (port state transition in this condition is not specified in the PTP protocol). In this way, the slave nodes 2 can avoid synchronizing the time with the time in the local clock of a master node 1 functioning as a secondary master before the local clock of that master node 1 has a predetermined accuracy.

If the corrected clock obtained as a result of correcting the local clock by the master synchronization unit 12A is within a preset threshold, the local clock is corrected by the external-signal synchronization unit 12B, which will be described later. Whether the corrected clock is within the preset threshold is determined by receiving the reference clock from the master node 1 functioning as the primary master node, and comparing that reference clock and the corrected clock. In doing so, the delay time of the external synchronization signal to each master node 1 is determined according to the configuration of the network 4. Thus, in one embodiment, in order to avoid variation in the local clocks of the master nodes 1 due to the path delay time of the external synchronization signal unique to the master nodes 1, each master node 1 corrects its local clock by adding the difference between a reference path delay time and its unique path delay time to the local clock.

The external-signal synchronization unit 12B corrects the local clock of its master node 1 by synchronizing with the external synchronization signal received by the communication unit 11 from the source clock node. In other words, each of the plurality of the master nodes 1 corrects its local clock based on the source clock by synchronizing with the external synchronization signal. Here, an equation of the relation between the local clock and the frequency f of the external synchronization signal (hereinafter, referred to as "relational equation") are defined as described in table 1.

TABLE 1

Relational Equations between Local Clock and Frequency F of External Synchronization Signal

| Condition | Relational Equation |
| --- | --- |
| 1. One cycle of a synchronization signal starts at time T0 on the local clock, and | One cycle of the synchronization signal starts at time $Tn = T0 + n/f$. |
| 2. Frequency of the synchronization signal is f. | |
| 3. In addition to conditions 1 and 2, the path delay of each synchronization signal has unique path delay time longer by d than the reference delay. | One cycle of the inputted synchronization signal starts at time $Tn = T0 + n/f + d$. One cycle of the reproduced synchronization signal starts at time $Tn = T0 + n/f$ |

According to the relational equations described in table 1, the time in the local clock time is corrected as to match with $T0+n/f+d$ at the start of one cycle of the synchronization signal. The information of these equations (variable values T0 and f) may be stored in the storage unit 13.

Note that although the local clock is corrected based on, for example, a timing synchronization signal such as a BB signal from the source clock node in this embodiment, the correction is not limited to such a manner. For example, the plurality of master nodes 1 may correct their local clocks by synchronizing with timing synchronization signals having the same frequency or frequencies with constant ratios to each other. This is because, instead of using the frequency f which is described in the equations in table 1, the equations can be maintained by using a frequency f' having a constant ratio to the frequency f.

As discussed above, in this correction, the timing of the synchronization signal to each master node 1 uniquely differs from the others according to the configuration of the network 4 in some cases. Thus, in one embodiment, in order to avoid variation in the local clocks of the master nodes 1 due to the path delay time of the external synchronization signal unique to the master nodes 1, each master node 1 uses the differential time d between the reference path delay time and its unique path delay time, specifically, corrects its local clock by adding the differential time d in the delay time of the input synchronization signal to the local clock, as described in condition 3 in table 1.

The state determination unit 12C determines whether or not the corrected clock obtained as a result of correcting the local clock by the external-signal synchronization unit 12B is within a preset threshold. If the corrected time is within the preset threshold, the communication unit 11 makes the state transition of its port from the SLAVE state to a state that allows the master node 1 to operate as a grand master clock (performs state transition specific to the present invention). Information on this state may be stored in the storage unit 13, for example. Whether or not the corrected clock is within the preset threshold is determined based on the difference between the start time of one cycle of a synchronization signal calculated from the corrected clock and the start time of one cycle of an actually input first external synchronization signal.

The state determination and the state transition by the state determination unit 12C are performed only by the master nodes 1 functioning as the secondary master nodes, and are not performed by the master node 1 functioning as the primary node. Although each master node 1 functioning as a secondary node is attached to the transmission system when, for example, the master node 1 is powered on or a fault is removed, the clock accuracy for the master node 1 that has just been attached is less. In such a situation, the master node 1 functioning as a secondary node makes the state transition of its port to the SLAVE state as an initial state when attached to the system, on the condition that a primary node is present. Thereafter, the state is transitioned from the SLAVE state by the state determination unit 12C, so that the master node 1 starts to operate as a grand master clock.

The primary-master determination unit 12D determines whether its master node 1 should continue functioning as the primary master node if the port state is the MASTER state, and determines whether its master node 1 should function as a new primary master node if the port state is the PASSIVE state. In this determination operation, the BMC algorithm specified in the PTP for grandmaster node may be used.

Specifically, the communication unit 11 receives Announce messages issued by the other master nodes 1 and sends Announce messages thereto at regular intervals, that is, the Announce messages are exchanged between a plurality of master nodes 1. Then, the primary-master determination unit 12D of each master node 1 determines whether or not its master node 1 should function as the primary master node, based on BMC selection criteria stored in the storage unit 13 and described in table 2. Note that information on whether the master node 1 functions as the primary master or a secondary master may be stored in the storage unit 13. Among the BMC selection criteria, the criteria such as Clock Class and Clock Accuracy are dynamically updated, and information stored in the storage unit 13 is updated at regular intervals.

TABLE 2

| BMC Selection Criteria | | |
| --- | --- | --- |
| PRIORITY 1 | Priority 1 | Statically assigned to all master nodes in clock domain |
| CLOCK CLASS | Quality of source clock for each master node | Dynamically changed by IEEE 1588 engine according to source clock |
| CLOCK ACCURACY | Clock accuracy for each master node | Dynamically changed by IEEE 1588 engine according to source clock |
| PRIORITY 2 | Priority 2 (used to determine priority among master nodes having same clock condition) | Statically assigned to all master nodes in clock domain |

As described above, a master node 1 in the initial state does not send the above-mentioned Announce messages to the slave nodes 2 since its port state has transitioned to the SLAVE state. That is, the slave nodes 2 do not synchronizes the time with the time in a master node 1 in the initial state (a master node 1 whose clock is not synchronized with that in the primary master or its accuracy is less). This avoids unnecessary exchange of messages between the master node 1 and the slave nodes 2.

In addition, a master node 1 in the initial state does not send Announce messages to the other master nodes 1, thereby avoiding unnecessary exchange of messages between the master nodes 1.

On the other hand, the master node 1 starts to function as a grand master clock (the port state transitions from the SLAVE state to the MASTER state or the PASSIVE state) when its clock corrected by the master synchronization unit 12A and the external-signal synchronization unit 12B is within a predetermined range of preset thresholds. In the subsequent operation, the master node 1 functioning as the primary master and the master nodes 1 functioning as the secondary masters synchronize with the external synchronization signal and constantly correct their local clocks based on the source clock. Using the BMC algorithm, each slave node 2 determines one of the plurality of master nodes 1 as its BMC, and synchronizes the time with the time in the determined BMC.

Note that, instead of receiving the external synchronization signal (such as a BB signal, referred to as "first external synchronization signal") from the source clock node, each master node 1 may synchronize with a different external synchronization signal having a different frequency from the first external synchronization signal (referred to as "second external synchronization signal") (or with an external reference clock) to correct its local clock. However, once starting to operate as a master node 1, the master node 1 always needs to synchronize with the first external synchronization signal to correct its local clock. This is because there is no guarantee that the second external synchronization signal matches with the first external synchronization signal in frequency, and the local clock cannot be corrected accurately.

Note that after starting to operate as a master node 1, the master node 1 can accurately correct its local clock based on a different external synchronization signal if it is an external synchronization signal having a frequency with a constant ratio to the first external synchronization signal. The first external synchronization signal therefore includes an external synchronization signal having a frequency with a constant ratio to the source clock.

Next, a specific example of the configuration of a slave node 2 consisting in a time synchronization system in accordance with one embodiment of the present invention will be described with reference to FIG. 5.

Figure 5:
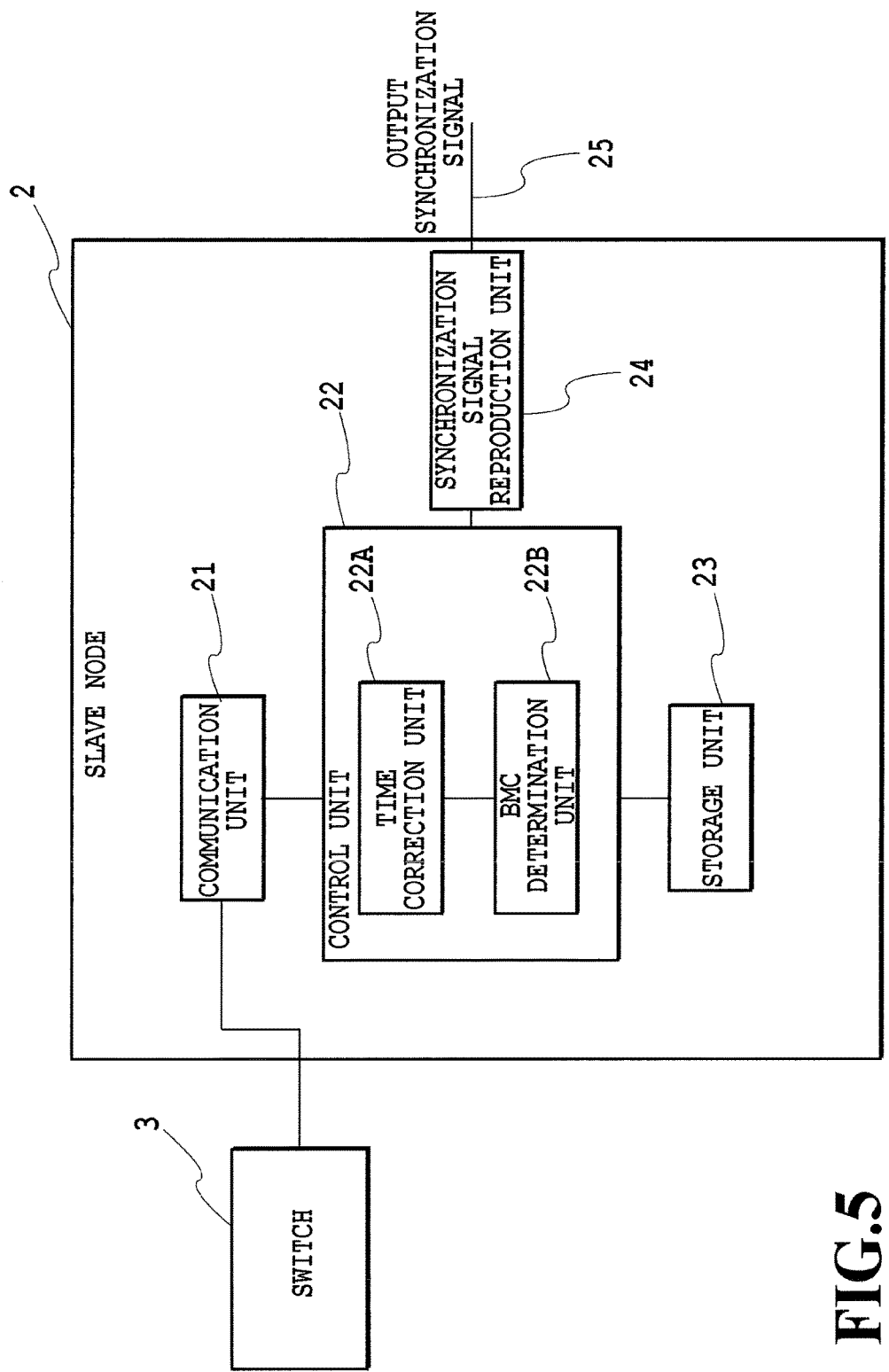
FIG. 5 is a diagram illustrating a specific example of the configuration of a slave node consisting in a time synchronization system in accordance with an embodiment of the present invention.

As illustrated in FIG. 5, each slave node 2 includes a communication unit 21, a control unit 22, a storage unit 23, and a synchronization-signal reproduction unit 24, and these units are coupled to each other by a bus in the node.

The communication unit 21 is a network interface that sends and receives PTP messages to and from a master node 1 (BMC).

The control unit 22 is a CPU. By executing a predetermined program stored in the storage unit 23, the control unit 22 performs control and operation such that a time correction unit 22A and a BMC determination unit 22B can function. Note that the control unit 22 may be implemented using hardware such as an ASIC, a PLD, or an FPGA, as in the master nodes 1.

The time correction unit 22A corrects the local clock of its slave node 2 by synchronizing the time with the time in the master node according to the time synchronization method in accordance with the PTP described with reference to FIG. 2.

The BMC determination unit 22B determines the BMC for its slave node 2 based on the BMC selection criteria stored in the storage unit 23 and described in table 2. Among the BMC selection criteria, criteria such as Clock Class and Clock Accuracy are dynamically updated by the information of Announce messages from the masters, and information stored in the storage unit 23 is updated at regular intervals.

The synchronization-signal reproduction unit 24 reproduces a synchronization signal output 25 by using the local clock of its slave node 2 corrected by the time correction unit 22A. The synchronization signal reproduction is performed according to the equation described in table 1 such that one cycle of the synchronization signal output 25 starts when the local clock matches with the start time of one cycle of the synchronization signal. This information of the equation may be stored in the storage unit 23 in advance in such a way as to match the master node. Also, it may be delivered in a message from the master node over a network.

Next, an example of processes of an initial operation in accordance with one embodiment of the present invention will be described with reference to FIGS. 6A and 6B. These processes are performed by one of the plurality of master nodes 1 when attaching to the time synchronization system after being detached from the system due to a fault for example. In the example illustrated in FIGS. 6A and 6B, one of the plurality of master nodes 1 (hereinafter, the master node 1B) has been in a fault state, and the master node 1B has been detached from the video transmission system and is to be attached to the same system again.

The external synchronization signal received from the source clock node in the time synchronization system in this embodiment is an external synchronization signal such as a BB signal or a 1PPS signal. This embodiment is based on the precondition that all the master nodes 1 receive the same external synchronization signal, and this external synchronization signal will be hereinafter referred to as "first external synchronization signal" in this embodiment. In other words, this time synchronization system is synchronized with the first external synchronization signal entirely. Further, in the initial state of the master node 1B to be attached to the video transmission system, the port state can transition to the SLAVE state, which is not specified in the PTP for grand master clock.

First, the master node 1B checks the presence of a master node functioning as the primary master node among the other master nodes 1 (hereinafter, the master node 1A) (step S601). The presence of the master node 1A may be checked by receiving the Announce message regularly sent by the master node LA. The Announce message includes Clock Accuracy information (clock accuracy) on the master node 1A. Thus, the master node 1B can check the presence of a master node with higher clock accuracy within the clock domain.

Further, as mentioned above, each master node 1 has information indicating whether that master node 1 is functioning as the primary master node or a secondary master node. Thus, the presence of the master node 1A can be checked by sending a management message by the master node 1B, and responding to that management message by the master node 1A. This communication may be performed through the switch 3, or through the network 4 having a communication capability.

If the master node 1b confirms the presence of the master node 1A in the step S601 (determining "Yes" in step S602), the master node 1B starts to operate as a secondary master node (step S603). Here, it will be noted that the port state of the master node 1B in step S603 is still the SLAVE state, in which the port can receive time information from the master node 1A.

On the other hand, if it fails to confirm the presence of the master node 1A, and a predetermined time period has not yet elapsed (determining "No" in step S604), returning to step S601, the above processes are reiterated. If the predetermined time period has elapsed (determining "Yes" in step S604), the master node 1B starts to operate as the primary master clock in step S613. In this case, the master node 1B may receive clock information (timestamp) from any node outside the clock domain (e.g. an NTP server connected to the master node 1B through a GPS satellite or a network) and correct the time based on that clock information. However, since the clock information from such an external node does not have the source clock selected for the clock domain, the master node 1B cannot correct its local clock based on the clock information from the node outside the domain after the master node 1B starts to operate as the primary master node.

Performing the operation in the Step S613 means that the master node 1B has failed to confirm the presence of the master node 1A having the reference clock. Thus, the master node 1B receives the first external synchronization signal from the external source clock node and corrects its local clock with the start time of one cycle set relative to that first external synchronization signal. In doing so, the master node 1B itself can determine the time T0 such that the relation between the corrected clock and the first external synchronization signal can match with the equation described in table 1.

Then, moving to step S605, the master node 1B receives the first external synchronization signal from the external source clock node and synchronizes with that first external synchronization signal to correct how its local clock advances (that is, synchronizes the cycle of the clock pendulums with that of the external source clock node).

In step S606, the master node 1B determines whether the relation between the corrected clock obtained as a result of correcting the clock in step S605 and whether the first external synchronization signal matches with the equation described in table 1 at a constant level of clock accuracy. This is determined using the difference between the start time of one cycle of a synchronization signal calculated from the corrected clock and the start time of one cycle of the actually inputted first external synchronization signal. For example, in one embodiment, a difference of 10 nanoseconds is determined to have highly accuracy. In another embodiment, the system may even tolerate a difference of 100 nanoseconds.

If the corrected clock is determined to have a constant level of clock accuracy in the determination in step S606 (determining "Yes" in step S606), the master node 1B starts to operate as a grand master clock (step S607).

Figure 6B:
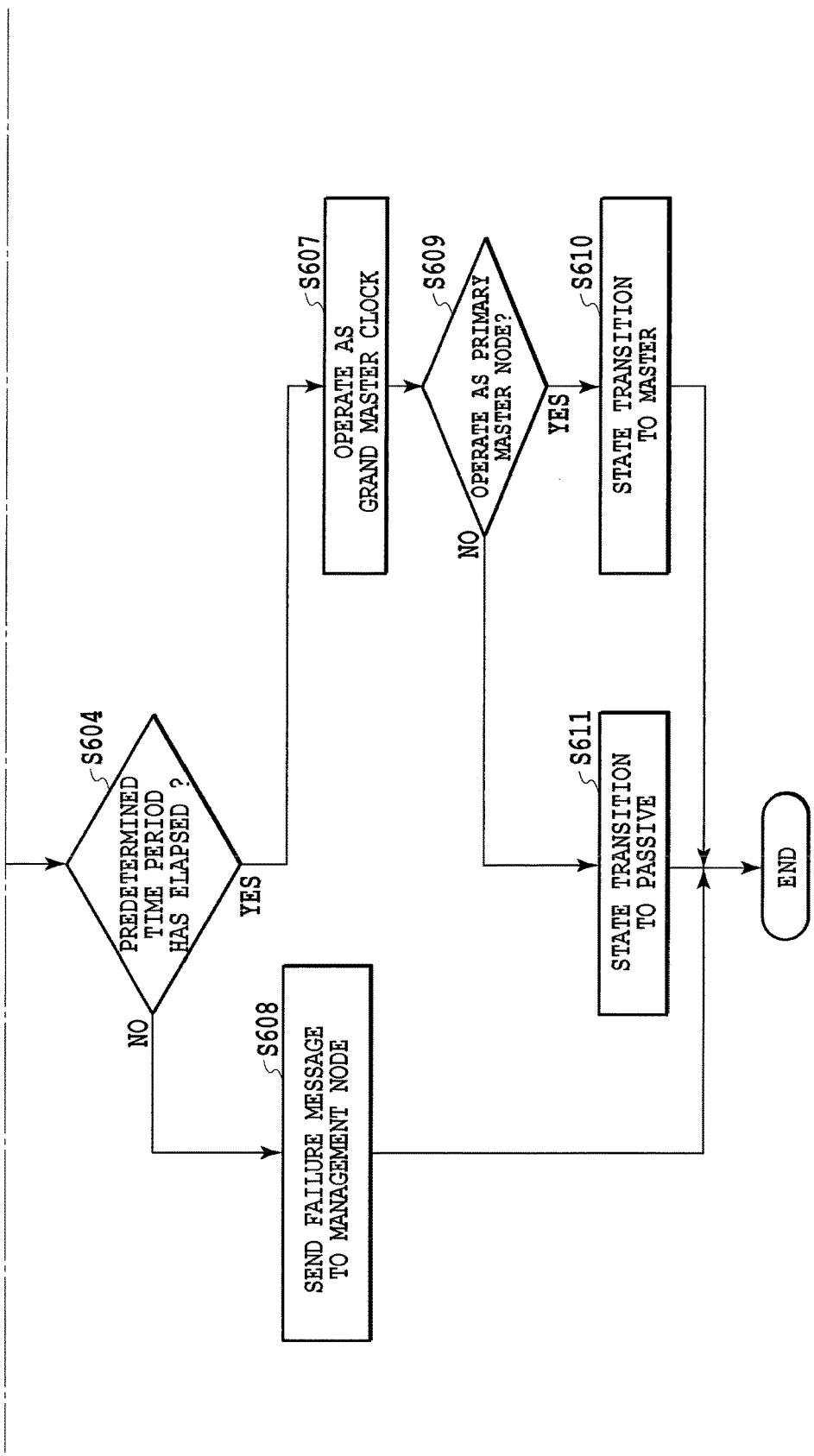
FIG. 6B is a flowchart illustrating an example of processes performed by a master node functioning as a secondary master node in accordance with one embodiment of the present invention.

On the other hand, if the corrected clock is determined not to have a constant level of clock accuracy in the determination in step S606 (determining "No" in step S606), the master node 1B sends a failure message to a management node (not illustrated) or the like (step S608), and the operations in FIGS. 6A and 6B end. This state means that no master node with a constant level of clock accuracy is determined to be present, and therefore the master node 1B is prevented from being attached to the time synchronization system, to thereby avoid producing an abnormal clock in the system.

Referring back to step S603, if the master node 1B starts to operate as a secondary master node, the master node 1B receives reference clock information from the master node LA functioning as the primary master node, and corrects its local clock based on that reference clock information (step S612).

If the corrected clock obtained as a result of correcting the clock in step S612 has a predetermined level of clock accuracy, moving to step S605, the master node 1B makes its port state transition from the SLAVE state to the initial state as a grandmaster. Then, as mentioned earlier, the master node 1B receives the first external synchronization signal and synchronizes with that first external synchronization signal to correct its local clock.

Referring again to step S607, if the local clock of the master node 1B as a grand master clock has a predetermined level of accuracy, the master node 1B determines whether to operate as the primary master node or to operate as a secondary master node according to the BMC algorithm in the PTP (step S609). This is done by comparing parameters (priority and accuracy) in the Announce messages from the other external master nodes 1 and parameters (priority and accuracy) of the local clock of the master node 1B.

If determining "Yes" in step S609 and the master node 1B functions as a primary master node, the port state of the master node 1B makes a transition to the MASTER state in step S610. As a result of this transition, the master node 1B is now a BMC candidate for the slave nodes 2 and sends Announce messages to the slave nodes 2. If a slave node 2 determines the master node 1B as its BMC, the master node 1B synchronizes the time with the time in that slave node 2 according to the PTP.

On the other hand, if determining "No" in step S609 and the master node 1B functions as a secondary master node, the master node 1B shifts to step S611, in which its port state makes a transition to the PASSIVE state.

In step S610 or S611, attaching the master node 1B as a grandmaster clock to the system is completed. Thereafter, according to the BMC algorithm in the PTP, the master node 1B determines whether it should function as the primary master node or function as a secondary master node by receiving Announce messages from the other master nodes (such as the master node 1A) at regular intervals. Further, the master node 1B corrects its local lock by synchronizing with the external synchronization signal from the source clock node.

After the state of the master node 1B makes a transition to the MASTER state or the PASSIVE state, the master node 1B functions as the primary master node or a secondary master node as long as its local clock through the synchronization with the external synchronization signal is corrected accurately. If the master node 1B cannot maintain its local clock accurate due to that the external synchronization signal cannot be received, then in one embodiment, the master node 1B changes its Clock Class value to a value indicating less accuracy, thereby avoiding that the slave nodes 2 selects the master node 1B as a BMC candidate. Alternatively, in one embodiment, the master node 1B transmits a failure message to a management node (not illustrated) or the like and voluntarily stops operating as a grand master clock.

Description has been given of the processing by the time synchronization system in accordance with the above embodiments. In the time synchronization system in accordance with the embodiments, a master node in the initial state firstly corrects its clock based on the reference clock from the primary master node and then corrects its clock by synchronizing with the external synchronization signal. Thus, unlike the prior technique, in the case where the source clock node generates the external synchronization signal from an independent clock source, the equation Tn=T0+n/f between the time of the primary master node and the synchronization signal can be accurately copied to the secondary master nodes.

Further, until the local clock of a master node in the initial state has a constant level of clock accuracy, its port state remains as the SLAVE state. In this way, the slave nodes do not synchronize the time with the time in a master node with less clock accuracy. This enhances the clock accuracy for the whole clock domain.

Hence, in the case where the source clock node generates the external synchronization signal from an independent clock source, any master node in the initial state can be added to the system. This improves the fault tolerance and operability of the system against addition and replacement of master nodes and therefore reduces the downtime to zero.

Note that the processes described in the flowchart in FIGS. 6A and 6B are merely exemplary. Some of the processes may be omitted, and/or other processes may be added. Further, the order of the processes is merely exemplary as well. The order of the processes may be changed without departing from the scope of claims.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A time synchronization system comprising:
a plurality of master nodes including a first master node and a second master node; and
a slave node configured to correct a local slave clock of the slave node by synchronizing with a local master clock of one of the plurality of master nodes,
wherein:
the first master node is configured to correct a first local master clock of the first master node at predetermined periodic intervals by synchronizing with a timing synchronization signal transmitted from a source clock node having a source clock specified in a clock domain,
if a second local master clock of the second master node has a greater error from the source clock than an error of the first local master clock from the source clock, the second master node is configured to:
perform a first correction on the second local master clock by synchronizing with the first local master clock; and
perform a second correction on the second local master clock by synchronizing with the timing synchronization signal from the source clock node when there is an error in the second local master clock from the first local master clock that occurs after the first correction, the error being within a preset threshold, and
the slave node is further configured to determine whether to synchronize the local slave clock with the first local master clock, or synchronize the local slave clock with the second local master clock when there is an error in the second local master clock from the first local master clock that occurs after the second correction, the error being within the preset threshold.

2. The time synchronization system according to claim 1, wherein the second master node is further configured to perform a third correction on the second local master clock at predetermined periodic intervals by synchronizing with the timing synchronization signal from the source clock node when there is an error in the second local master clock from the first local master clock that occurs after the second correction, the error being within the preset threshold.

3. The time synchronization system according to claim 1, wherein the second master node is further configured to perform a fourth correction on the second local master clock by synchronizing with clock information from a node outside the clock domain before performing the first correction.

4. The time synchronization system according to claim 1, wherein the second master node is further configured to:
   check presence of the first master node by exchanging messages with the first master node before performing the first correction; and
   perform the first correction if the second master node confirms the presence of the first master node.

5. The time synchronization system according to claim 1, wherein the second master node is further configured to:
   check presence of the first master node by exchanging messages with the first master node before performing the first correction; and
   perform a fifth correction on the second local master clock by synchronizing with the timing synchronization signal from the source clock node if the second master node fails to confirm the presence of the first master node.

6. The time synchronization system according to claim 1, wherein the second master node is further configured to:
   check presence of the first master node by exchanging messages with the first master node before performing the first correction; and
   send an abnormality notification if the second master node fails to confirm the presence of the first master node.

* * * * *